United States Patent
Shamoto

(10) Patent No.: US 9,090,184 B2
(45) Date of Patent: Jul. 28, 2015

(54) VEHICLE HEADREST DEVICE

(75) Inventor: Takehisa Shamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/809,852

(22) PCT Filed: Feb. 15, 2011

(86) PCT No.: PCT/JP2011/053181
§ 371 (c)(1),
(2), (4) Date: Jan. 11, 2013

(87) PCT Pub. No.: WO2012/111097
PCT Pub. Date: Aug. 23, 2012

(65) Prior Publication Data
US 2013/0313880 A1 Nov. 28, 2013

(51) Int. Cl.
*A47C 7/36* (2006.01)
*B60N 2/48* (2006.01)

(52) U.S. Cl.
CPC ............... *B60N 2/4802* (2013.01); *B60N 2/48* (2013.01); *B60N 2/4885* (2013.01)

(58) Field of Classification Search
CPC .......... A47C 7/46; A47C 7/22; B60N 2/4885; B60N 2/4808
USPC ................... 297/216.12, 391, 452.27, 452.37
See application file for complete search history.

(56) References Cited

U.S. PATENT DOCUMENTS

| | | | | |
|---|---|---|---|---|
| 6,149,231 A | * | 11/2000 | Wustholz | 297/216.12 |
| 6,550,856 B1 | * | 4/2003 | Ganser et al. | 297/61 |
| 6,688,697 B2 | * | 2/2004 | Baumann et al. | 297/391 |
| 7,770,967 B2 | * | 8/2010 | Hirota et al. | 297/216.12 |
| 8,033,603 B2 | * | 10/2011 | Meert | 297/220 |
| 2005/0280296 A1 | | 12/2005 | Ohchi et al. | |
| 2006/0175881 A1 | * | 8/2006 | Akaike et al. | 297/216.12 |
| 2006/0279114 A1 | * | 12/2006 | Toda et al. | 297/216.12 |

(Continued)

FOREIGN PATENT DOCUMENTS

| | | |
|---|---|---|
| JP | U-55-122660 | 9/1980 |
| JP | A-4-027632 | 1/1992 |

(Continued)

*Primary Examiner* — David R Dunn
*Assistant Examiner* — Alexander Harrison
(74) *Attorney, Agent, or Firm* — Oliff PLC

(57) ABSTRACT

A vehicle headrest device capable of both securing the comfort of an occupant under normal conditions and enhancing the whiplash injury prevention effect, while enabling the headrest body to be made thinner. In this device, a dilatant pad formed from a material with dilatant characteristics is disposed at a front portion of a headrest body. The pad is soft in normal circumstances, and so the occupant's head can be softly supported by the headrest body. However, the pad instantly becomes hard when load from the occupant's head is imparted to the front portion of the headrest body such as during an impact to the rear face of a vehicle, suppressing rearward head movement. Moreover, a thinner headrest body can be achieved due to being able to dispense with a foam body disposed at the front portion of the headrest body to secure the comfort of the occupant.

4 Claims, 13 Drawing Sheets

(56) References Cited

U.S. PATENT DOCUMENTS

| | | |
|---|---|---|
| 2007/0085400 A1 | 4/2007 | Terada et al. |
| 2007/0241593 A1* | 10/2007 | Woerner .................. 297/216.12 |
| 2007/0257528 A1* | 11/2007 | Akaike et al. ............ 297/216.12 |
| 2008/0252113 A1* | 10/2008 | Alexander et al. ....... 297/216.12 |
| 2010/0314918 A1* | 12/2010 | Alexander et al. ....... 297/216.12 |
| 2011/0198899 A1* | 8/2011 | Hertl ........................ 297/216.12 |
| 2011/0198900 A1* | 8/2011 | Trimborn et al. ........ 297/216.12 |
| 2011/0233974 A1* | 9/2011 | Yamaguchi et al. ..... 297/216.12 |
| 2011/0309661 A1* | 12/2011 | Meert ...................... 297/216.12 |

FOREIGN PATENT DOCUMENTS

| | | |
|---|---|---|
| JP | A-9-085755 | 3/1997 |
| JP | A-10-181404 | 7/1998 |
| JP | A-10-211840 | 8/1998 |
| JP | B2-3039859 | 5/2000 |
| JP | A-2001-333832 | 12/2001 |
| JP | A-2008-095708 | 4/2008 |
| JP | B2-4102779 | 6/2008 |
| JP | B2-4294629 | 7/2009 |

* cited by examiner

VEHICLE HEADREST DEVICE

TECHNICAL FIELD

The present invention relates to a vehicle headrest device provided to the top end side of a vehicle seat to support the head of an occupant from behind.

BACKGROUND ART

Patent Document 1 discloses a headrest equipped with a low-rebound low-expanded urethane member that undergoes deformation under a load input at low speed and undergoes a smaller amount of deformation under a load input at high speed, provided to a front face of a plate member (a support member) attached to a headrest frame. A standard urethane foam is disposed to the front side of the low-rebound low-expanded urethane member. The headrest thereby attempts to both secure the comfort (sense of softness) of an occupant under normal conditions whilst suppressing the head of the occupant from sinking too far into the headrest during a vehicle rear face collision, and suppressing a whiplash injury prevention effect from being reduced.

[Patent Document 1] Japanese Patent Application Laid-Open (JP-A) No. 2001-333832

DISCLOSURE OF INVENTION

Technical Problem

However, in a headrest such as described above, in order to adequately secure the comfort (sense of softness) of the occupant under normal conditions, there is a need to thicken the thickness dimensions of the standard urethane foam disposed to the front side of the low-rebound low-expanded urethane member to a degree. It is therefore difficult to keep the headrest thin.

Moreover, during a vehicle rear face collision, the head of the occupant is supported by the support member through a pad (the standard urethane foam and the low-rebound low-expanded urethane member). However, the head of the occupant sinks into the headrest by the amount by which the pad resiliently deforms. There is therefore further room for improvement from the perspective of enhancing the whiplash injury prevention effect.

In consideration of the above circumstances, an object of the present invention is to achieve a vehicle headrest device capable of both securing the comfort of an occupant under normal conditions and also enhancing the whiplash injury prevention effect, while enabling the headrest body to be made thinner.

Solution to Problem

A vehicle headrest device according to an exemplary embodiment includes: a headrest body provided at a top end side of a seatback in a vehicle seat, wherein the headrest body includes a support member that is attached to a headrest frame configuring a framework, a front face of the support member is formed in a curved plane shape, and the support member is formed with plural holes; and a head-load bearing member that is formed from a material with dilatant characteristics, and is disposed at a front portion of the headrest body, the head load-bearing member being supported from the rear by the support member due to a rear face of the head load-bearing member being in contact with the front face of the support member, and the head load-bearing member being retained at the support member in a curved state along the front face of the support member by plural projections that project out rearwards from the head load-bearing member fitting into the plural holes.

In the vehicle headrest device of the exemplary embodiment, the head load-bearing member is disposed at the front portion of the headrest body. The head load-bearing member is formed from a material with dilatant characteristics, and since it is soft under normal conditions the head of an occupant can be softly supported by the headrest body. The comfort of the occupant under normal conditions can accordingly be secured.

On the other hand, during for example a vehicle rear face collision, when load (impact force) from the head of an occupant attempting to move under inertia towards the vehicle rear side is imparted to the front portion of the headrest body, the head load-bearing member hardens whilst being supported from the rear by the headrest frame. The head is thereby suppressed from moving rearwards (tilting backwards), enabling the whiplash injury prevention effect to be enhanced. Moreover, when impact force is removed the head-load bearing member returns to its original softness, and so comfort of the occupant can be reestablished.

Thus in the present invention, a foamed body such as urethane foam, disposed at the front portion of the headrest body to secure the comfort of the occupant, can be omitted or significantly reduced in thickness due to the head load-bearing member being soft under normal conditions. A reduction in thickness of the headrest body can thereby be achieved.

A vehicle headrest device according to the exemplary embodiment is the vehicle headrest device wherein the headrest body further includes a support member that is attached to the headrest frame and is capable of supporting the head load-bearing member from the rear.

In the vehicle headrest device of the exemplary embodiment, when load from the head of an occupant is imparted to the head-load bearing member, the head load-bearing member can be supported from the rear side by the support member attached to the headrest frame. The load (impact force) to the head load-bearing member can accordingly be imparted in a desirable manner, and the head-load bearing member can be caused to harden rapidly. Due to the head of an occupant being supported by the support member through the hardened head load-bearing member, the rearwards movement of the head can be even better suppressed.

A vehicle headrest device according to the exemplary embodiment is the vehicle headrest device wherein a rear face of the head load-bearing member is in contact with a front face of the support member.

In the vehicle headrest device, the head load-bearing member can be well supported by the support member due to the support member attached to the headrest frame being in surface contact with the head-load bearing member.

A vehicle headrest device according to the exemplary embodiment is the vehicle headrest device wherein: the head load-bearing member includes plural projections that project out rearwards; and the plural projections fit into plural holes that are formed in the support member.

In the vehicle headrest device, the head load-bearing member can be positioned to the support member due to the plural projections that project out towards the rear from the head load-bearing member being fitted into the plural holes formed in the support member. An easy manufacturing operation for the device can thereby be achieved.

A vehicle headrest device according to the exemplary embodiment is the vehicle headrest device wherein: the front face of the support member is formed in a curved plane shape;

and the head load-bearing member is retained at the support member in a curved state along the front face of the support member by the plural projections fitting into the plural holes.

In the vehicle headrest device, the plural projections provided to the head load-bearing member fit into the plural holes formed in the support member. The head load-bearing member is thereby retained at the support member in a curved state along the curved profiled front face of the support member. The head load-bearing member can accordingly be prevented from unintentionally coming off from the support member during manufacture of the vehicle headrest device, enabling the manufacturing operation of the device to be made even easier.

A vehicle headrest device according to the exemplary embodiment is the vehicle headrest device wherein: the head load-bearing member includes a projection that projects rearwards from an outer peripheral side of the head load-bearing member; and the projection engages with an indentation portion formed to an outer peripheral portion of the support member.

In the vehicle headrest device, the head load-bearing member can be positioned to the support member by the projection that projects rearwards from the outer peripheral side of the head load-bearing member engaging with the indentation portion formed to the outer peripheral portion of the support member. An easy manufacturing operation for the device can thereby be achieved.

A vehicle headrest device according to the exemplary embodiment is the vehicle headrest device wherein the headrest body further includes: a foam body that has been integrally foam molded together with the headrest frame, the support member and the head load-bearing member; and a headrest cover covering the foam body.

In the vehicle headrest device, during manufacture the support member and the head-load bearing member are assembled to the headrest frame, and the foam body is integrally foam molded at the periphery thereof, after which the headrest cover is then covered the molded product. The device can accordingly be easily manufactured.

A vehicle headrest device according to the exemplary embodiment is the vehicle headrest device wherein the headrest body further includes: a foam body that has been integrally foam molded together with the headrest frame and the support member; and a headrest cover, wherein the head load-bearing member is attached to a back face of the headrest cover and the headrest cover covers the foam body.

In the vehicle headrest device, during manufacture the support member is assembled to the headrest frame, and the foam body is integrally foam molded at the periphery thereof, after which the headrest cover with the head load-bearing member attached to the back face thereof is then covered over the molded product. The device can accordingly be easily manufactured.

A vehicle headrest device according to the exemplary embodiment is the vehicle headrest device wherein the head load-bearing member includes: a plate shaped portion formed in a plate-shape and disposed along a front face of the headrest body; and plural leg portions respectively projecting out rearwards from plural locations on a rear face of the plate shaped portion with each of the rear ends of the plural leg portions facing the support member.

In the vehicle headrest device, when load from the head of an occupant is imparted to the front portion of the headrest body, the head load-bearing member disposed with the plate shaped portion along the front face of the headrest body becomes hard. The head load-bearing member is provided with the plural leg portions respectively projecting out rearwards from plural locations on the rear face of the plate shaped portion with each of the rear ends of the plural leg portions facing the support member. The plural leg portions are in contact with the support member and so the plate shaped portion, or in other words the head of the occupant, is thereby suppressed from moving rearwards. Moreover, the plate-shaped portion can be set so as to appropriately deform to conform to the shape of the rear of the head of the occupant. The reaction force input to the rear of the head can thereby be dispersed over a wide surface area.

A vehicle headrest device according to the exemplary embodiment is the vehicle headrest device wherein the head-load bearing member includes: a plate shaped portion formed in a plate shape and disposed along a front face of the headrest body; and a side wall portion projecting out in a frame shape rearwards from outer peripheral sides of a rear face of the plate shaped portion with a rear ends of the side wall portion facing the support member.

In the vehicle headrest device, when load from the head of an occupant is imparted to the front portion of the headrest body, the head load-bearing member disposed with the plate shaped portion along the front face of the headrest body becomes hard. The head load-bearing member is provided with the side wall portion projecting out in a frame shape rearwards from outer peripheral sides of the rear face of the plate shaped portion with the rear ends of the side wall portion facing the support member. The side wall portion are in contact with the support member and so the plate shaped portion, or in other words the head of the occupant, is thereby suppressed from moving rearwards. Moreover, the central side of the plate shaped portion can be set so as to appropriately deform to conform to the shape of the rear of the head. The reaction force input to the rear of the head can thereby be dispersed over a wide surface area.

A vehicle headrest device according to the exemplary embodiment is the vehicle headrest device wherein the head load-bearing member includes a single leg portion or plural leg portions projecting out rearwards from a central side of the rear face of the plate-shaped portion with rear end(s) of the leg portion(s) facing the support member.

In the vehicle headrest device, deformation of the central side of the plate shaped portion is suppressed due to the single leg portion or plural leg portions projecting out rearwards from the central side of the rear face of the plate shaped portion of the head load-bearing member being in contact with the support member. The deformation mode of the central side of the plate shaped portion can accordingly be easily set or modified by appropriately setting or modifying the number and/or shape of the single leg portion or plural leg portions.

A vehicle headrest device according to the exemplary embodiment is the vehicle headrest device wherein: the headrest body includes a foam body supported by the headrest frame and a headrest cover covering the foam body; and the head load-bearing member is formed in a plate shape and is disposed between the front face of the foam body and the headrest cover with a plate face of the head load-bearing member in contact with the front face of the foam body.

In the vehicle headrest device, when load from the head of an occupant is imparted to the front portion of the headrest body, the head load-bearing member formed in a plate shape and disposed between the front face of the foam body and the headrest cover becomes hard. Due to the plate face of the head load-bearing member being disposed in a state of contact with the front face of the foam body, the load imparted to the front face of the foam body through the head load-bearing member can be dispersed over a wide surface area of the front face of the foam body. The amount of deformation of the foam body can thereby be reduced, and rearward movement of the head of the occupant that is imparting load to the foam body through the head load-bearing member can be suppressed.

Advantageous Effects of Invention

As explained above, the vehicle headrest device according to the present invention is capable of both securing the comfort of an occupant under normal conditions and also enhancing the whiplash injury prevention effect, while enabling the headrest body to be made thinner.

BEST MODE FOR CARRYING OUT THE INVENTION

First Exemplary Embodiment

Explanation follows regarding a vehicle headrest device 10 according to a first exemplary embodiment of the present invention, with reference to FIG. 1 to FIG. 5. In each of the drawings the arrow FR indicates the vehicle front direction, the arrow UP indicates the vehicle top direction, and the arrow W indicates the vehicle width direction (the vehicle left-right direction), as appropriate.

Figure 1:
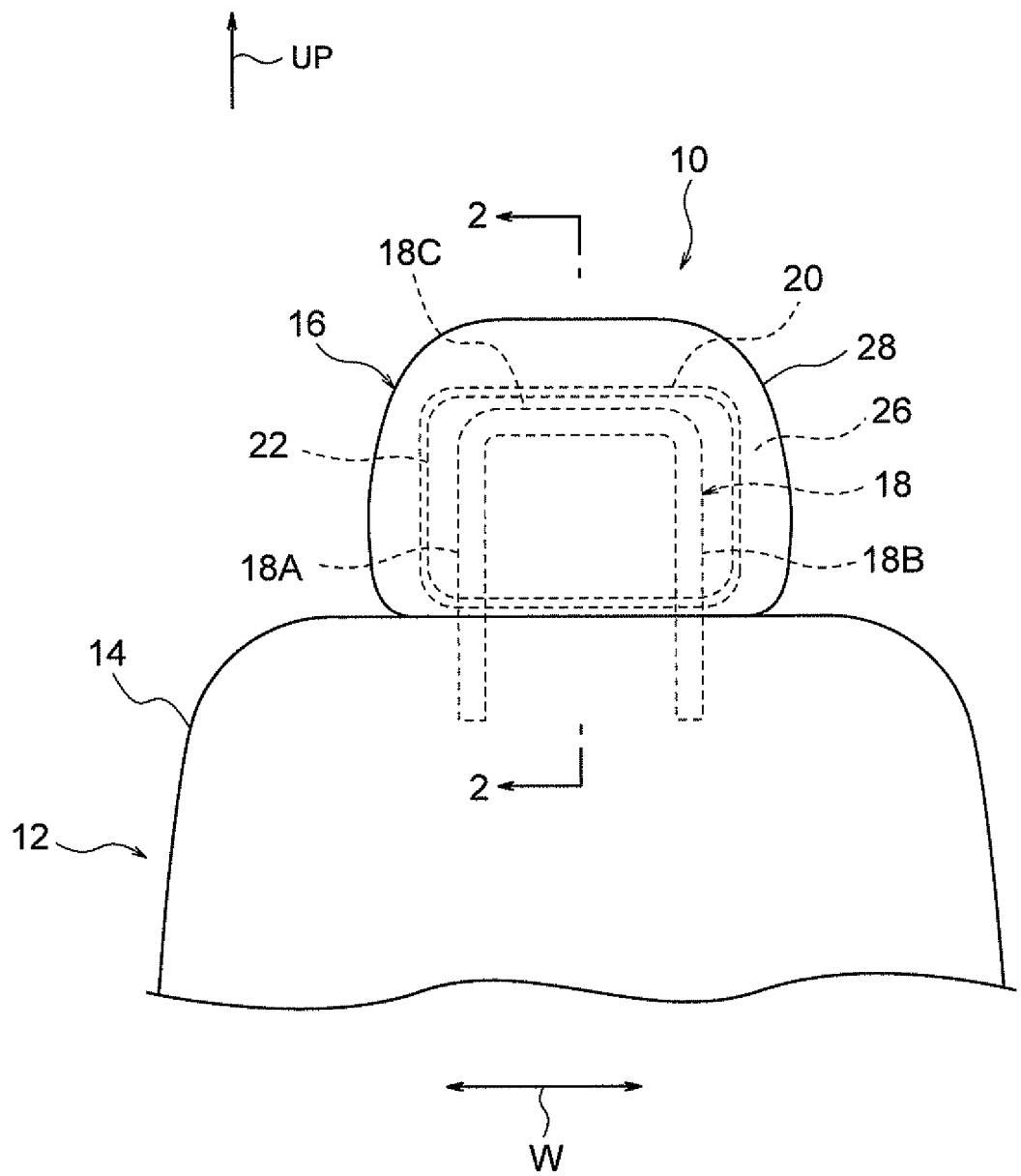
FIG. 1 is a front view illustrating a partial configuration of a vehicle seat mounted with a vehicle headrest device according to a first exemplary embodiment of the present invention.

As shown in FIG. 1, the vehicle headrest device 10 according to the present exemplary embodiment is equipped with a headrest body 16 provided at the top end side of a seatback 14 in a vehicle seat 12. The headrest body 16 has a headrest frame 18 that serves as a framework member. The headrest frame 18 is formed by bending metal pipe material into an inverted substantially U-shape, and is provided with a left and right pair of side sections 18A, 18B (leg sections) that extend in the top-bottom direction of the seatback 14, and an upper section 18C (connection section) that connects along the seat width direction between the top end portions of the pair of side sections 18A, 18B.

The bottom end sides of the pair of side sections 18A, 18B are connected to a headrest support (not shown in any of the drawings) provided to the top end portion of a seatback frame that is a framework member of the seatback 14. The headrest frame 18 is thereby supported by the seatback frame, and the headrest body 16 is attached to the top end side of the seatback 14. Note that the front-rear, left-right and top-bottom directionality of the headrest body 16 is substantially aligned with the front-rear, left-right and top-bottom directionality of the vehicle mounted with the vehicle seat 12.

Figure 2:
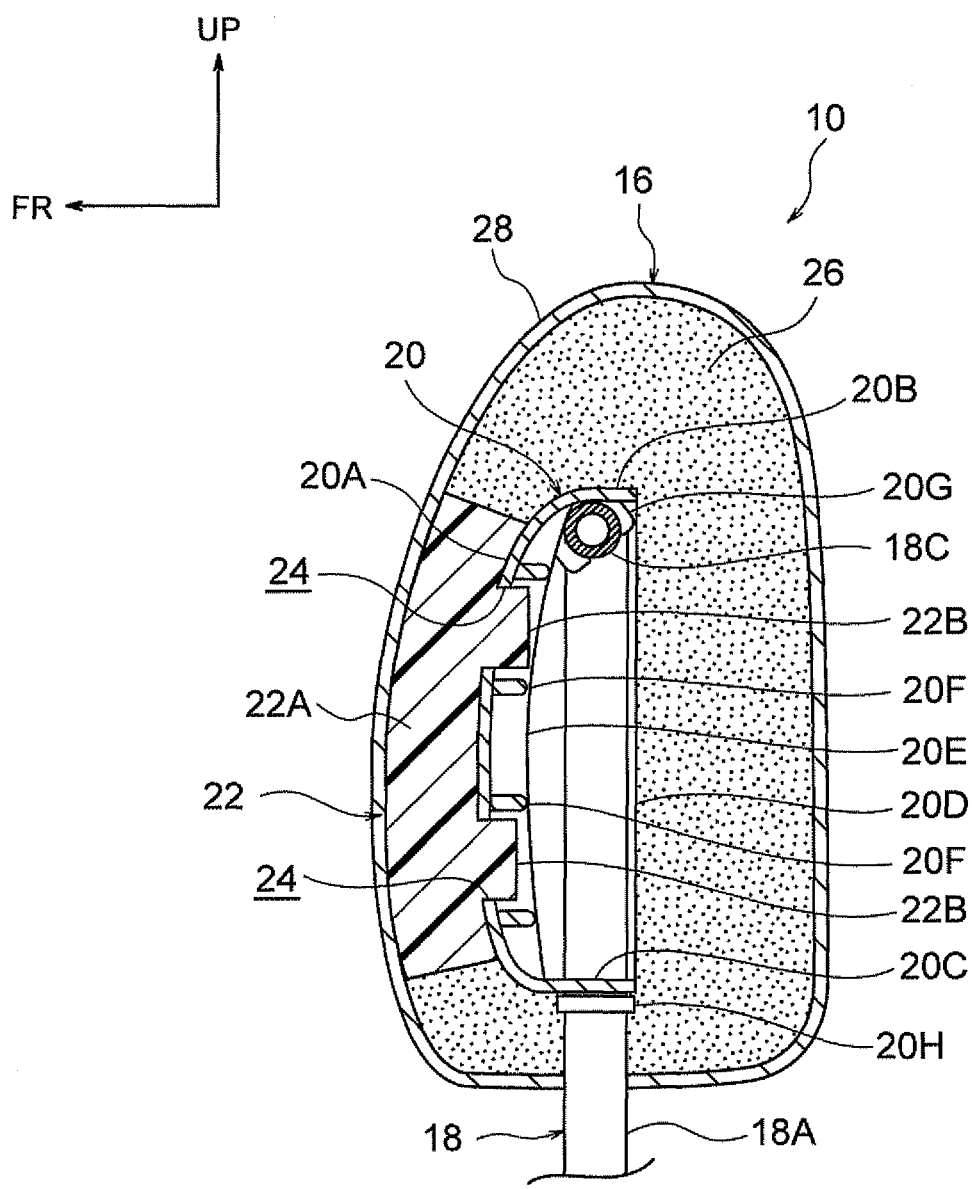
FIG. 2 is an enlarged vertical cross-section taken along line 2-2 in FIG. 1.
Figure 3:
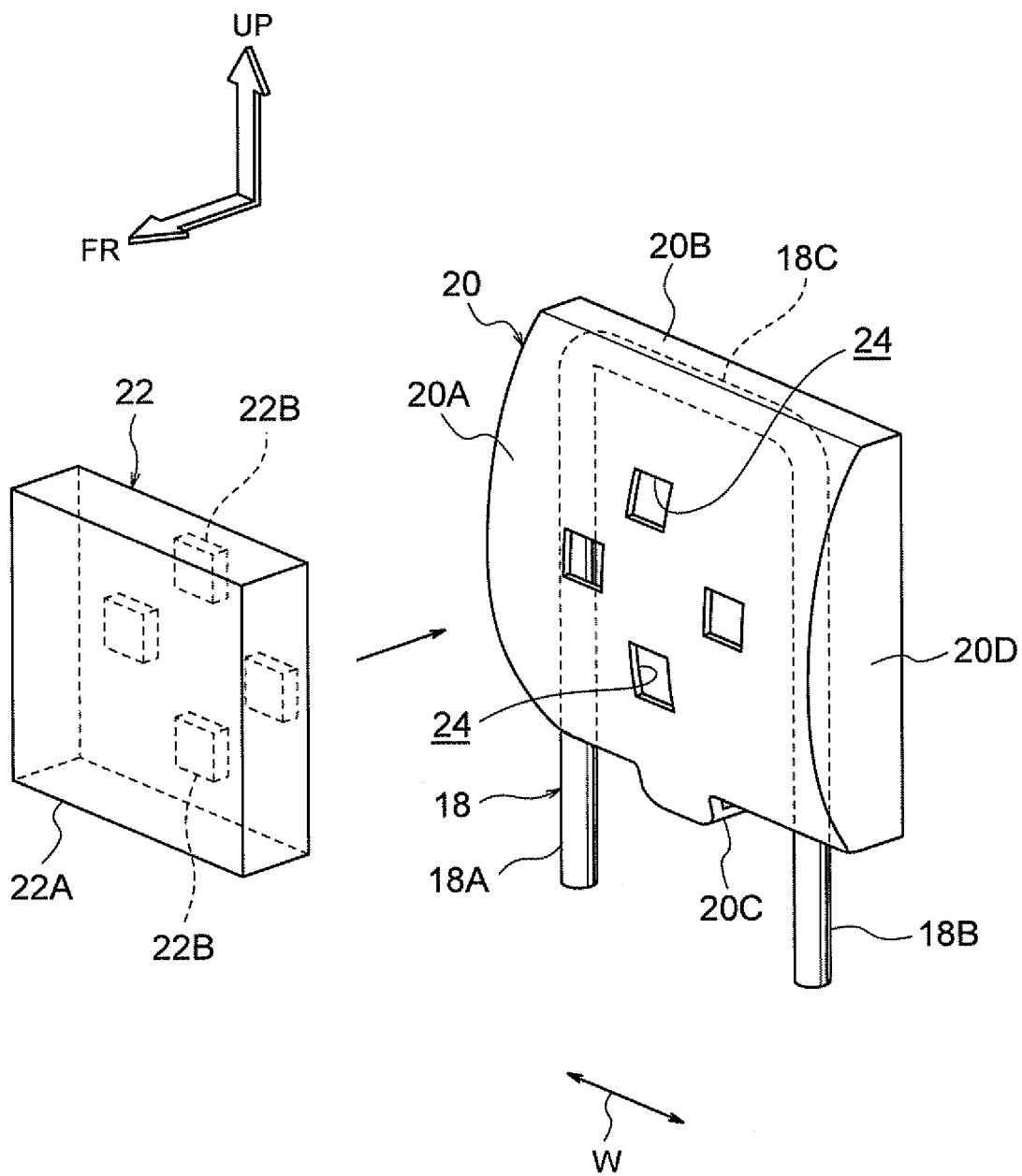
FIG. 3 is a perspective view illustrating a configuration of a headrest frame, insert and dilatant pad according to the first exemplary embodiment of the present invention.
Figure 4:
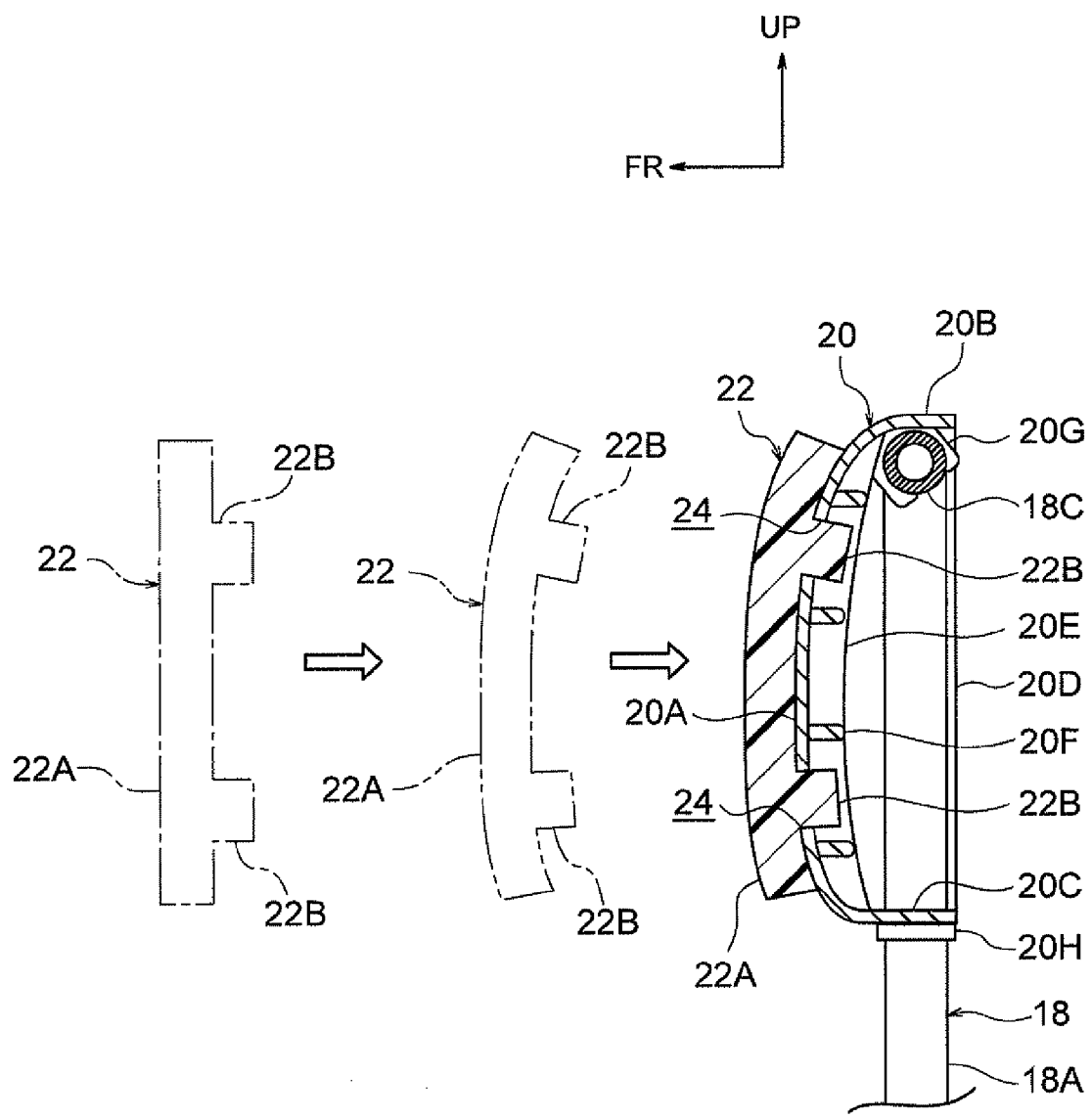
FIG. 4 is a cross-section to illustrate how the dilatant pad is attached to the insert.

As shown in FIG. 2 and FIG. 3, an insert 20 (support member) formed for example by injection molding a resin material is attached to a top portion side of the headrest frame 18. The insert 20 includes a front wall section 20A that is disposed at the front side of the headrest frame 18. The front wall section 20A is formed in a thin plate shape that curves around along the front face of the headrest body 16. As shown in FIG. 4, an upper wall section 20B and a lower wall section 20C extend out towards the headrest body 16 rear side from the top end and bottom end of the front wall section 20A. Side wall sections 20D extend out respectively towards the headrest body 16 rear side from both the left and right edges of the front wall section 20A. The back face of the front wall section 20A is integrally provided with plural vertical ribs 20E formed in elongated flat plate shapes extending along the headrest body 16 top-bottom direction, and plural horizontal ribs 20F formed in elongated flat plate shapes extending along the headrest body 16 left-right direction. The vertical ribs 20E and the horizontal ribs 20F are integrally formed and disposed in a lattice formation, enhancing the rigidity of the insert 20.

A pair of left and right anchor portions 20G (see FIG. 2 and FIG. 4, not shown in the other drawings) are provided to the upper wall section 20B of the insert 20 so as to project out towards the insert 20 back face side. The anchor portions 20G are formed with a substantially C-shaped cross-section and clip around the upper section 18C of the headrest frame 18. A left and right pair of anchor portions 20H similarly configured to the anchor portions 20G are provided to the lower wall section 20C. The anchor portions 20H clip around the side sections 18A, 18B of the headrest frame 18. The insert 20 is thereby mounted to the headrest frame 18.

A dilatant pad 22 is disposed on the front face of the front wall section 20A and serves as a head load-bearing member. The dilatant pad 22 is formed from a material processing dilatant properties, for example d3o™ produced by d3o™ lab company UK. The d3o™ is a material that is soft when not imparted with an impact and when impact is weak. However d3o™ instantly becomes hard and exhibits excellent energy absorbing capability when imparted with a strong impact. The dilatant pad 22 is disposed in a front portion of the headrest body 16, namely in a portion further forwards in the headrest body 16 than the headrest frame 18. When an occupant is seated in the vehicle seat 12 the dilatant pad 22 is disposed to the rear of the head of the occupant.

The dilatant pad 22 is equipped with a main body portion 22A formed in a plate shape that is thick in the plate thickness dimension. The main body portion 22A faces the headrest frame 18 from the front, and the rear face of the main body portion 22A is in contact with the front face of the front wall section 20A of the insert 20. Plural (four in this case) projections 22B formed in block shapes project out from the rear face (back face) of the main body portion 22A towards the rear side. The plural projections 22B are disposed on the top end side, a lower portion side, a left portion side and a right portion side of the rear face of the main body portion 22A. Plural (four in this case) holes 24 (through holes) are formed in the front wall section 20A to correspond to the plural projections 22B. The plural holes 24 are formed in rectangular shapes, and the respective projections 22B fit into the plural holes 24. The dilatant pad 22 is thereby positioned on and assembled to the insert 20. The dilatant pad 22 is supported by the insert 20 with the main body portion 22A in a curved state along the front face of the insert 20 by the plural projections 22B fitting into the plural holes 24.

Note that when the dilatant pad 22 described above is attached to the insert 20, the dilatant pad 22 is first bent from its natural state, illustrated by the single dot intermittent lines in FIG. 4, to a curved state, illustrated by the double dot intermittent lines in FIG. 4. In this curved state the plural projections 22B of the dilatant pad 22 are fitted into the plural holes 24 of the insert 20. In this fitted together state, the side portions of the plural projections 22B are pressed against the hole edge portions of the plural holes 24 by a force of the dilatant pad 22 attempting to resiliently return to its natural state. The dilatant pad 22 is thereby prevented from coming off from the insert 20.

As shown in FIG. 2, a urethane foam 26 (foam body, urethane member) configuring a headrest pad (cushioning material) is provided together with the dilatant pad 22 at a top portion side of the headrest frame 18. The urethane foam 26 is integrally foam molded together with the headrest frame 18, the insert 20 and the dilatant pad 22, and supported by the headrest frame 18 with the front face of the dilatant pad 22 in an exposed state. The top portion of the headrest frame 18, the insert 20 and the dilatant pad 22, except for at the locations at the front face thereof, are covered by the urethane foam 26.

A headrest cover 28 sewn from a sheet-form material such as cloth, leather or synthetic leather further covers the urethane foam 26 described above. The front face of the dilatant pad 22 is covered by the headrest cover 28. The front face of the dilatant pad 22 is in contact with the back face of the headrest cover 28.

When manufacturing the vehicle headrest device 10, first the insert 20 is attached to the headrest frame 18 and the dilatant pad 22 is attached to the insert 20 to produce a sub-assembly. The sub-assembly component is then placed in a mold for urethane foam molding, and the urethane foam 26 is integrally foam molded around the sub-assembly component. The headrest cover 28 is then covered over the molded product to complete the vehicle headrest device 10.

Explanation follows regarding the operation and advantageous effects of the present exemplary embodiment.

In the vehicle headrest device 10 configured as described above, the dilatant pad 22 is disposed at a front portion of the headrest body 16. The dilatant pad 22 is formed from a material with dilatant characteristics, and since it is soft under normal conditions the head of an occupant can be softly supported by the headrest body 16. The comfort of the occupant under normal conditions can accordingly be secured.

However, during for example a vehicle rear face collision, when load (impact force) from the head of an occupant attempting to move under inertia towards the vehicle rear side is imparted to the front portion of the headrest body 16, the dilatant pad 22 instantly hardens whilst being supported from the rear by the insert 20 attached to the headrest frame 18. The head is thereby suppressed from moving rearwards, enabling the whiplash injury prevention effect to be enhanced.

Figure 5:
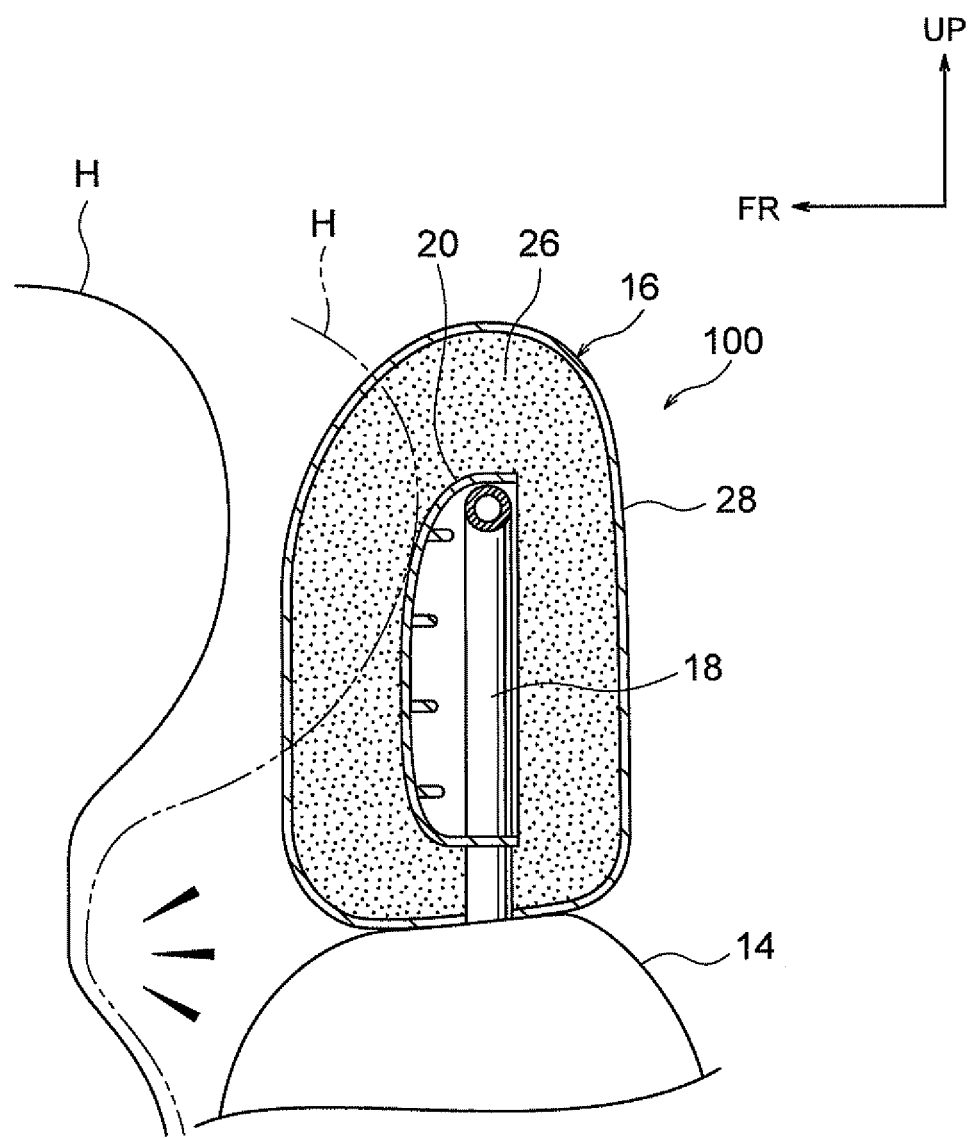
FIG. 5 is a vertical cross-section illustrating a configuration of a comparative example to a vehicle headrest device according to the first exemplary embodiment of the present invention.

Namely, when as in the comparative example 100 shown in FIG. 5, the dilatant pad 22 is omitted and ordinary urethane foam 26 is disposed at the front portion of the headrest body 16, the head H of an occupant moves to the rear by a large amount due to the large resilient deformation of the urethane foam 26. There is therefore a possibility of the neck region of the occupant sustaining a whiplash injury, however the present exemplary embodiment is able to prevent or effectively suppress such an occurrence.

The d3o™ configuring the dilatant pad 22 moreover has excellent energy absorbing capability, and so the whiplash injury prevention effect can be enhanced by an even greater amount. Moreover, when impact force is removed the dilatant pad 22 returns to its original softness, and so comfort of the occupant can be resecured.

Thus in the present exemplary embodiment, a foamed body, such as of urethane foam, disposed at the front portion of the headrest body 16 to secure the comfort of the occupant, can be omitted due to the dilatant pad 22 being soft under normal conditions. A reduction in thickness of the headrest body 16 can thereby be achieved.

Moreover, in the present exemplary embodiment, when the load from the head of an occupant is imparted to the dilatant pad 22, the dilatant pad 22 is supported from the rear side by the insert 20 attached to the headrest frame 18. The load (impact force) to the dilatant pad 22 is accordingly imparted in a desirable manner, and the dilatant pad 22 can be caused to harden rapidly. Due to the head of an occupant being supported by the insert 20 through the hardened dilatant pad 22, the rearwards movement of the head can be even better suppressed. The dilatant pad 22 can also be well supported by the insert 20 due to the insert 20 and the dilatant pad 22 being in surface contact with each other.

Furthermore, in the present exemplary embodiment, the dilatant pad 22 can be positioned and assembled to the insert 20 due to the plural projections 22B that project out towards the rear from the main body portion 22A of the dilatant pad 22 being fitted into the plural holes 24 formed in the front wall section 20A of the insert 20. An easy manufacturing operation for the vehicle headrest device 10 can thereby be achieved. Namely, the insert 20 and the dilatant pad 22 are assembled to the headrest frame 18, and the dilatant pad 22 can be prevented from unintentionally displacing with respect to the insert 20 prior to placing the assembly in the mold for urethane foam molding. The burden on the operator can thereby be reduced.

In the present exemplary embodiment, the dilatant pad 22 is retained to the insert 20 with the main body portion 22A of the dilatant pad 22 in a curved state along the front face of the curved profiled front wall section 20A due to the plural projections 22B provided to the dilatant pad 22 being fitted into the plural holes 24 formed in the front wall section 20A of the insert 20. The dilatant pad 22 can accordingly be prevented from unintentionally coming off from the insert 20 during manufacture of the vehicle headrest device 10, particularly during foam molding of the urethane foam 26, enabling the manufacturing operation of the vehicle headrest device 10 to be made even easier.

Note that whereas the first exemplary embodiment is a configuration in which the plural projections 22B are provided to the dilatant pad 22 and the plural holes 24 are formed in the insert 20 the second aspect of the invention is not limited thereto. The dilatant pad 22 can be positioned with respect to the insert 20 when there is a single projection 22B and single hole 24 by for example configuring the shapes of the projection 22B and the hole 24 in irregular shapes. The second aspect of the invention may also be configured with the projections 22B and the holes 24 omitted.

The first exemplary embodiment is configured such that the headrest cover 28 is used to cover the urethane foam 26 that has been integrally foam molded together with the headrest frame 18, the insert 20 and the dilatant pad 22. However the first to the sixth aspects of the invention and the eighth to the twelfth aspects of the invention are not limited thereto. For example, configuration may be made such that the dilatant pad 22 is attached to the back face of the headrest cover 28, and the headrest cover 28 is then used to cover the urethane foam 26 that has been integrally foam molded together with the headrest frame 18 and the insert 20.

The first exemplary embodiment is configured such that the front face of the dilatant pad 22 is in contact with the back face of the headrest cover 28, however the first to the twelfth aspects of the invention are not limited thereto. Configuration may be made such that thin urethane foam 26 is interposed between the front face of the dilatant pad 22 and the headrest cover 28. This point similarly applies to the other exemplary embodiments of the present invention explained below.

The first exemplary embodiment described above is configured with the insert 20, however the first aspect of the invention is not limited thereto and configuration may be made omitting the insert 20. In such cases the dilatant pad 22 (the head load-bearing member) is configured so as to be supported from the rear by the headrest frame 18. This point similarly applies to the other exemplary embodiments of the present invention explained below.

Explanation follows regarding other exemplary embodiments of the present invention. Note that configurations and operations that are fundamentally the same as those of the first exemplary embodiment are allocated the same reference numerals to the first exemplary embodiment and further explanation thereof is omitted.

Second Exemplary Embodiment

Figure 6:
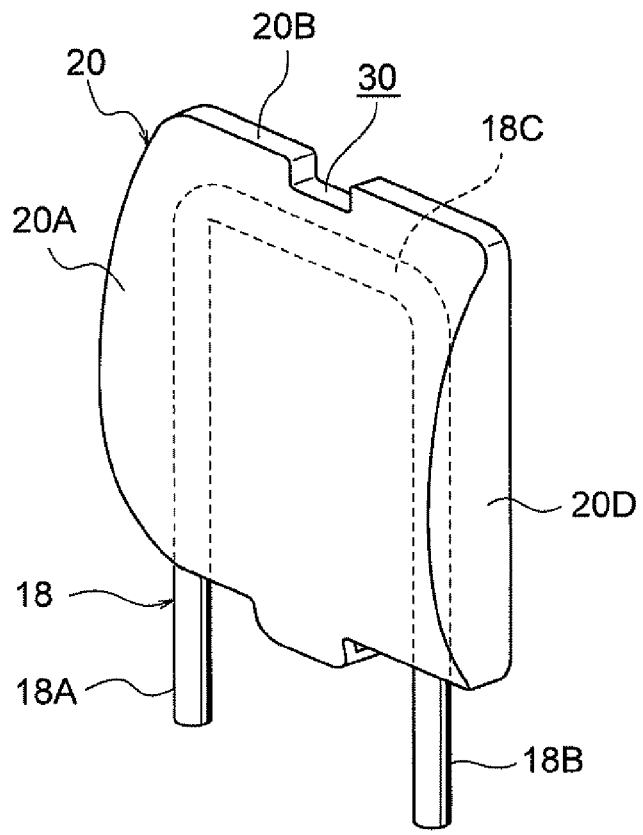
FIG. 6 is a perspective view illustrating a configuration of a headrest frame and insert according to a second exemplary embodiment of the present invention.
Figure 7:
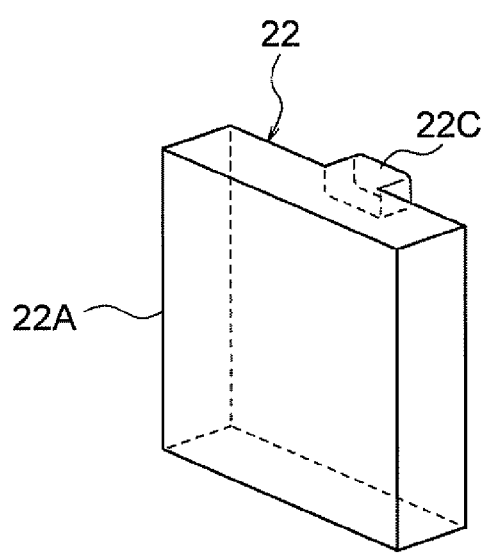
FIG. 7 is a perspective view illustrating a configuration of a dilatant pad according to the second exemplary embodiment of the present invention.
Figure 8:
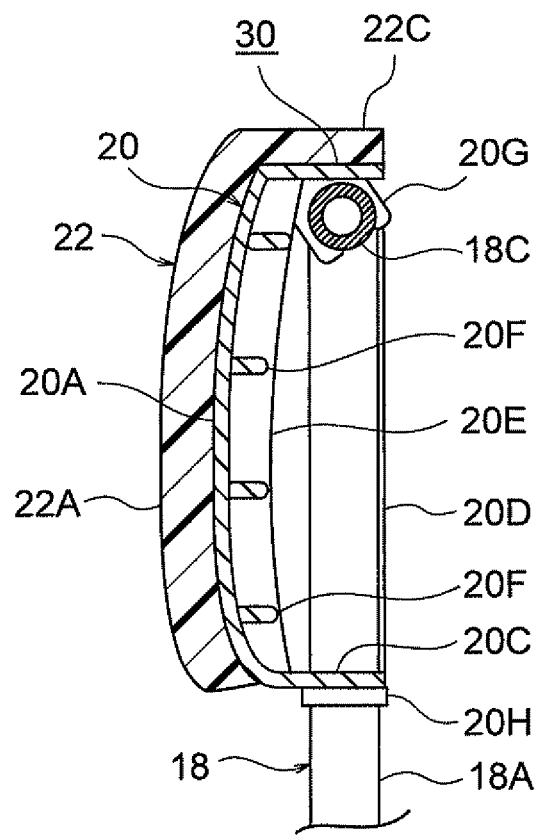
FIG. 8 is a vertical cross-section illustrating a configuration of a headrest, an insert and a dilatant pad according to the second exemplary embodiment of the present invention.

FIG. 6 is a perspective view illustrating an insert 20 and a headrest frame 18 according to a second exemplary embodiment of the present invention. FIG. 7 is a perspective view of a dilatant pad 22 according to the second exemplary embodiment. FIG. 8 is a vertical cross-section illustrating the headrest frame 18, the insert 20 and the dilatant pad 22 according to the second exemplary embodiment.

The present exemplary embodiment is configured fundamentally the same as the first exemplary embodiment. However, as shown in FIG. 6, in the insert 20 according to the present exemplary embodiment the plural holes 24 of the first exemplary embodiment are omitted, and an indented portion 30 is formed at a seat width direction central portion at the top end portion (outer peripheral portion) of the insert 20. As shown in FIG. 7, in the dilatant pad 22 of the present exemplary embodiment the projections 22B of the first exemplary embodiment are also omitted, and a projection 22C is provided protruding out towards the rear side at the top end portion of the dilatant pad 22.

In the present exemplary embodiment, as shown in FIG. 8, the dilatant pad 22 is positioned and assembled to the insert 20 by fitting (engaging) the projection 22C of the dilatant pad 22 in the indented portion 30 of the insert 20. Subsequent processing such as integral foam molding of the urethane foam 26 can then be performed easily. The present exemplary embodiment accordingly exhibits fundamentally the same operation and advantageous effects as those of the first exemplary embodiment.

The second exemplary embodiment is configured with the indented portion 30 formed to the top end portion of the insert 20, however the fifth aspect of the invention is not limited thereto. As long as the position of the indented portion 30 is determined according to the orientation of the insert 20 during foam molding of the urethane foam 26 configuration may be made with the indented portion 30 formed at a side portion or the bottom end portion of the insert 20. However, in such cases the position of the projection 22C of the dilatant pad 22 needs to be changed according to the position of the indented portion 30.

Third Exemplary Embodiment

Figure 9:
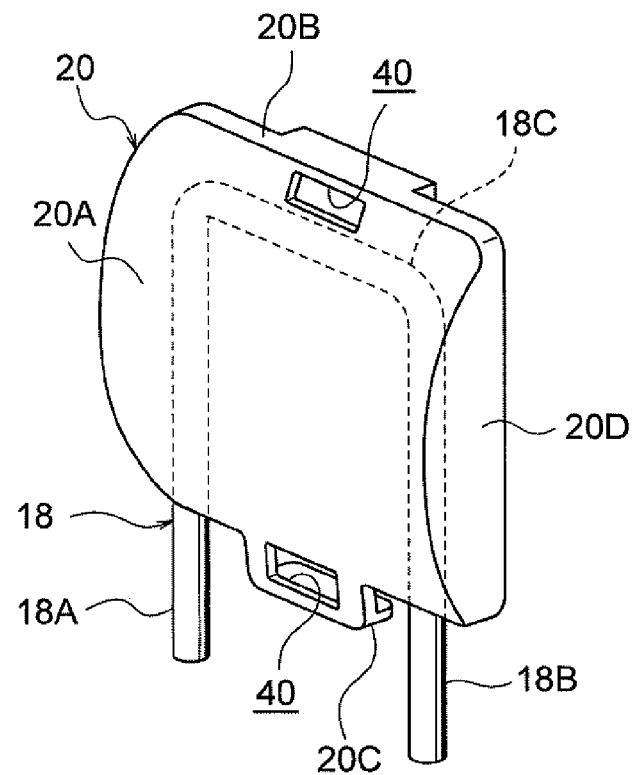
FIG. 9 is a perspective view illustrating a configuration of a headrest frame and an insert according to a third exemplary embodiment of the present invention.
Figure 10:
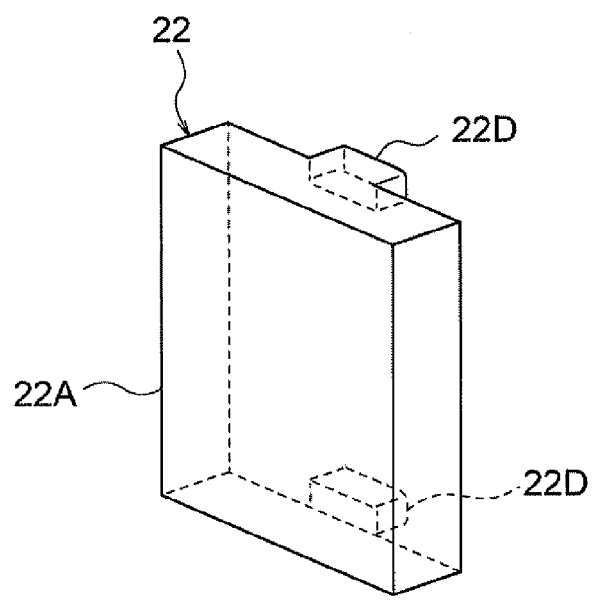
FIG. 10 is a perspective view illustrating a configuration of a dilatant pad according to the third exemplary embodiment of the present invention.
Figure 11:
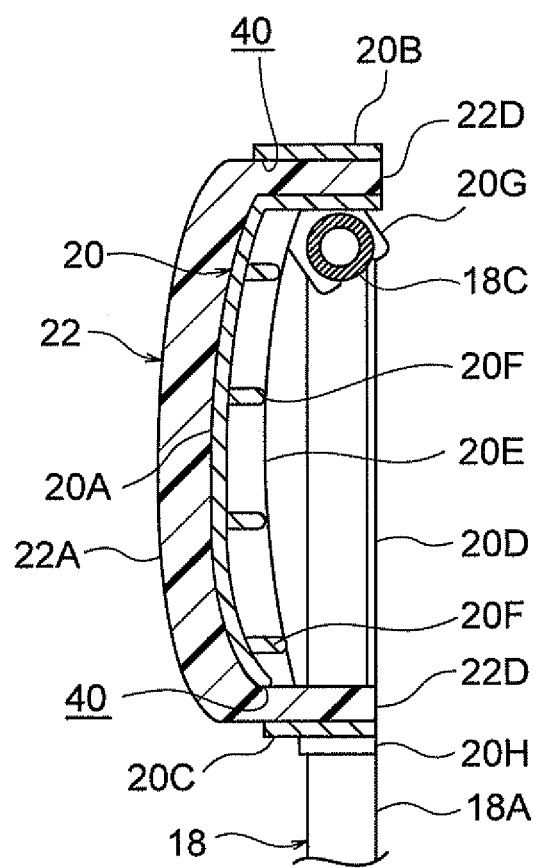
FIG. 11 is a vertical cross-section illustrating a configuration of a headrest, an insert and a dilatant pad according to the third exemplary embodiment of the present invention.

FIG. 9 is a perspective view illustrating an insert 20 and a headrest frame 18 according to a third exemplary embodiment of the present invention. FIG. 10 is a perspective view of a dilatant pad 22 according to the third exemplary embodiment. FIG. 11 is a vertical cross-section illustrating the headrest frame 18, the insert 20 and the dilatant pad 22 according to the third exemplary embodiment.

The present exemplary embodiment is configured fundamentally the same as the first exemplary embodiment. However, as shown in FIG. 9, in the insert 20 according to the present exemplary embodiment the plural holes 24 of the first exemplary embodiment are omitted, and holes 40 (through holes) are formed respectively in seat width direction central portions of a top end portion and a bottom end portion (outer peripheral sides) of the insert 20. The top and bottom pair of holes 40 are formed in rectangular shapes elongated along the left-right direction of a headrest body 16. Locations of the upper wall section 20B and the lower wall section 20C of the insert 20 disposed in the vicinity of the holes 40 extend out towards the rear side. As shown in FIG. 10, in the dilatant pad 22 according to the present exemplary embodiment the plural projections 22B of the first exemplary embodiment are omitted, and projections 22D are provided respectively at a top end portion and a bottom end portion of the dilatant pad 22 projecting out towards the rear side.

In the present exemplary embodiment, as shown in FIG. 11, the top and bottom pair of projections 22D of the dilatant pad 22 are fitted into the top and bottom pair of holes 40 of the insert 20. In this state, the dilatant pad 22 is assembled firmly to the insert 20 due to the extension portions described above at the upper wall section 20B and the lower wall section 20C interfering with the projections 22D. The dilatant pad 22 can accordingly be well prevented from unintentionally coming off from the insert 20 during foam molding of the urethane foam 26.

Fourth Exemplary Embodiment

Figure 12:
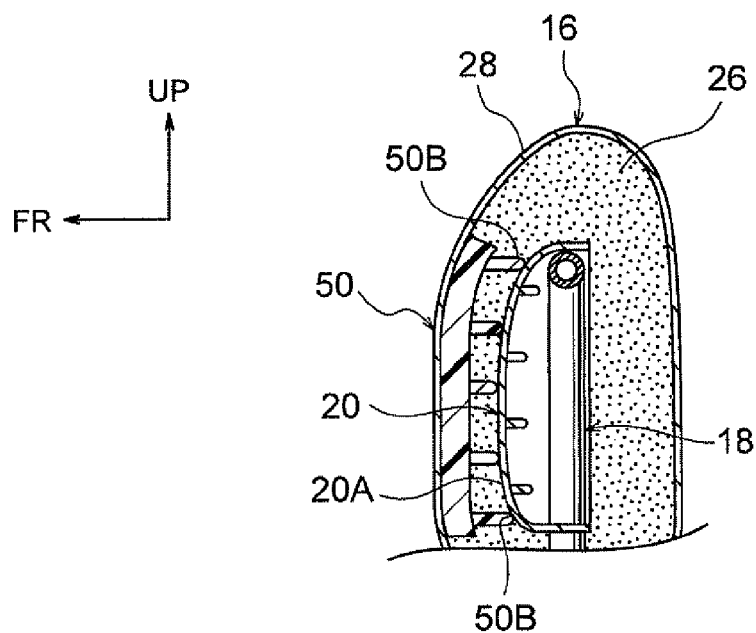
FIG. 12 is a vertical cross-section illustrating a configuration of a vehicle headrest device according to a fourth exemplary embodiment of the present invention.
Figure 13:
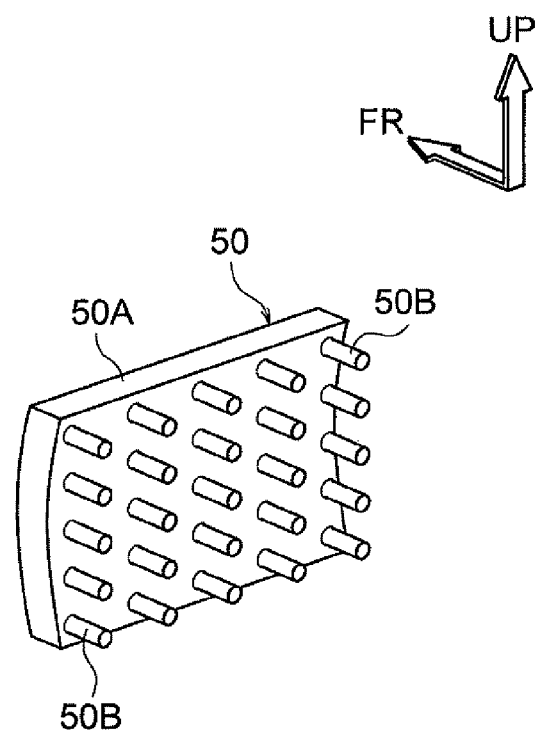
FIG. 13 is a perspective view illustrating a configuration of a dilatant pad according to the fourth exemplary embodiment of the present invention.

FIG. 12 is a vertical cross-section illustrating a vehicle headrest device according to a fourth exemplary embodiment of the present invention. FIG. 13 is perspective view of a dilatant pad 50 serving as a head load-bearing member of the fourth exemplary embodiment.

The present exemplary embodiment is configured fundamentally the same as the first exemplary embodiment. However, as shown in FIG. 12 and FIG. 13, in the present exemplary embodiment the configuration of the dilatant pad 50 differs from the dilatant pad 22 of the first exemplary embodiment. The dilatant pad 50 is formed from d3o™, and is equipped with a plate shaped portion 50A disposed along the front face of a headrest body 16. The plate shaped portion 50A is formed with a thickness dimension along the headrest body 16 front-rear direction that is substantially thinner than the main body portion 22A of the first exemplary embodiment, and the front face of the plate shaped portion 50A is in contact with the back face of the headrest cover 28. The dilatant pad 50 includes plural leg portions 50B that respectively project out towards the rear side from plural locations on the back face of the plate shaped portion 50A. The plural leg portions 50B are formed in circular column shapes and the rear end (the leading end) of the plural leg portions 50B make contact with the front face of the front wall section 20A of the insert 20. Urethane foam 26 is present between the back face of the plate shaped portion 50A and the front face of the front wall section 20A at a region excluding the plural leg portions 50B. Note that anchor portions 20G, 20H are not shown in FIG. 12.

In the present exemplary embodiment, when load from the head of an occupant is imparted to the front portion of the headrest body 16, the dilatant pad 50 disposed with the plate shaped portion 50A along the front face of the headrest body 16 becomes hard. The rear ends of the plural leg portions 50B of the dilatant pad 50 are in contact with the front wall section 20A of the insert 20 and so the plate shaped portion 50A is supported by the insert 20 through the leg portions 50B. The plate shaped portion 50A, or in other words the head of the occupant, is thereby suppressed from moving rearwards. Moreover, the plate shaped portion 50A deforms to conform to the shape of the rear of the head of the occupant due to setting a thin thickness dimension for the plate shaped portion 50A. The reaction force input to the rear of the head of the occupant can thereby be dispersed over a wide surface area. Note that the above fourth exemplary embodiment is configured with the rear ends of the plural leg portions 50B in contact with the front wall section 20A of the insert 20, however the ninth aspect of the invention is not limited thereto provided that plural leg portions are facing and contactable with an insert.

Fifth Exemplary Embodiment

Figure 14:
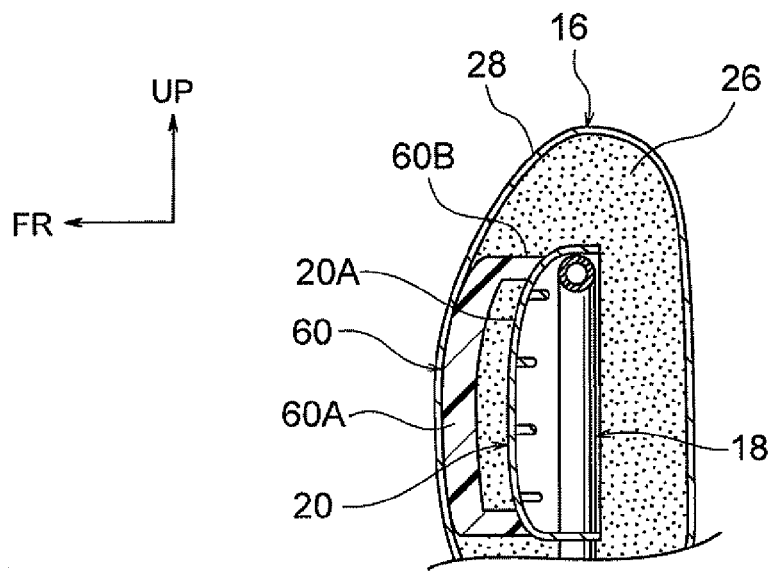
FIG. 14 is a vertical cross-section illustrating a configuration of a vehicle headrest device according to a fifth exemplary embodiment of the present invention.
Figure 15:
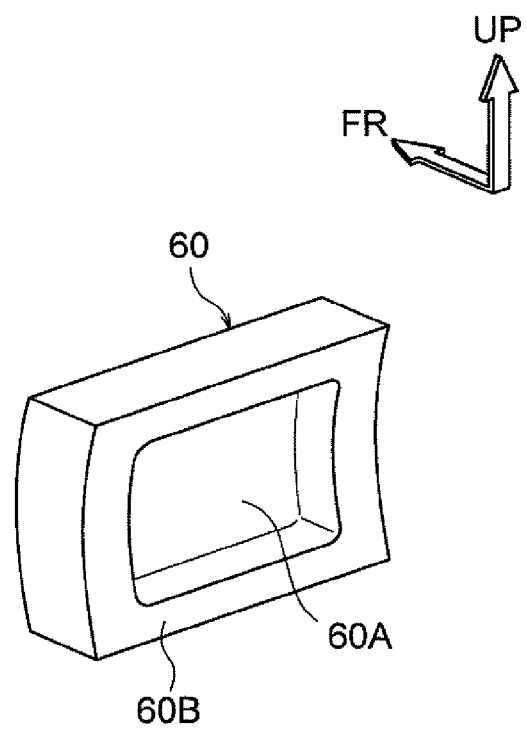
FIG. 15 is a perspective view illustrating a configuration of a dilatant pad according to the fifth exemplary embodiment of the present invention.

FIG. 14 is a vertical cross-section of a vehicle headrest device according to a fifth exemplary embodiment of the present invention. FIG. 15 is a perspective view of a dilatant pad 60 serving as a head load-bearing member according to the fifth exemplary embodiment.

The present exemplary embodiment is configured fundamentally the same as the first exemplary embodiment. However, as shown in FIG. 14 and FIG. 15, in the present exemplary embodiment the configuration of the dilatant pad 60 is different from that of the dilatant pad 22 of the first exemplary embodiment. The dilatant pad 60 is formed from d3o™ and is provided with a plate shaped portion 60A disposed along the front face of a headrest body 16. The plate shaped portion 60A is formed with a thickness dimension along the headrest body 16 front-rear direction that is substantially thinner than the main body portion 22A of the first exemplary embodiment and the front face of the plate shaped portion 60A is in contact with the back face of the headrest cover 28. The dilatant pad 60 includes side wall portions 60B that project out in a frame shape from the outer peripheral side of the rear face of the plate shaped portion 60A and the rear faces of the side wall portions 60B contact (face) the front face of a front wall section 20A of an insert 20. Urethane foam 26 is present between the rear face of the plate shaped portion 60A and the front face of the front wall section 20A at a region excluding the side wall portions 60B. Note that the anchor portions 20G, 20H are not shown in FIG. 14.

In the present exemplary embodiment, when load from the head of an occupant is imparted to the front portion of the headrest body 16, the dilatant pad 60 disposed with the plate shaped portion 60A along the front face of the headrest body 16 hardens. The rear end faces of the side wall portions 60B of the dilatant pad 60 are in contact with the front wall section 20A of the insert 20, and therefore the plate shaped portion 60A is supported by the insert 20 through the side wall portions 60B. Rearwards movement of the plate shaped portion 60A, or in other words the head of the occupant, is accordingly suppressed. Moreover, the central side of the plate shaped portion 60A deforms to conform to the shape of the rear of the head of the occupant due to setting a thin thickness dimension for the plate shaped portion 60A. The reaction force input to the rear of the head of the occupant can thereby be dispersed over a wide surface area, similarly to in the fourth exemplary embodiment. Note that the above fifth exemplary embodiment is configured with the rear end faces of the side wall portions 60B in contact with the front wall section 20A of the insert 20, however the tenth aspect of the invention is not limited thereto provided that the side wall portions are facing and contactable with an insert.

Sixth Exemplary Embodiment

Figure 16:
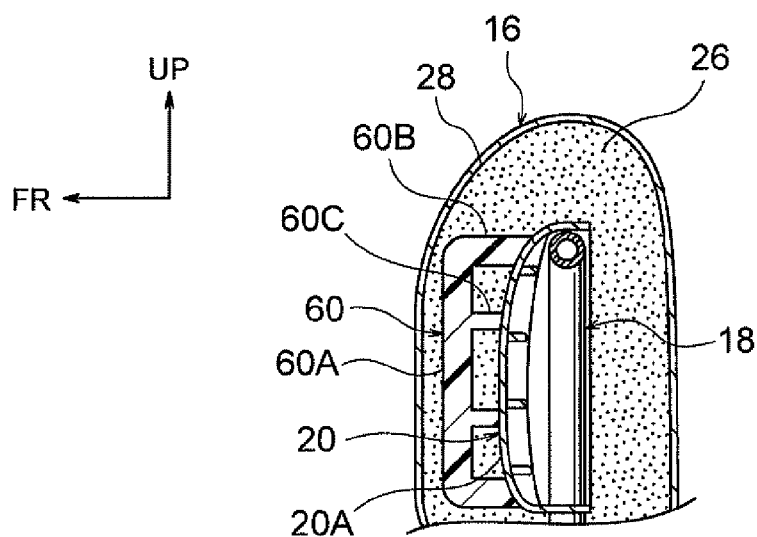
FIG. 16 is a vertical cross-section illustrating a configuration of a vehicle headrest device according to a sixth exemplary embodiment of the present invention.
Figure 17:
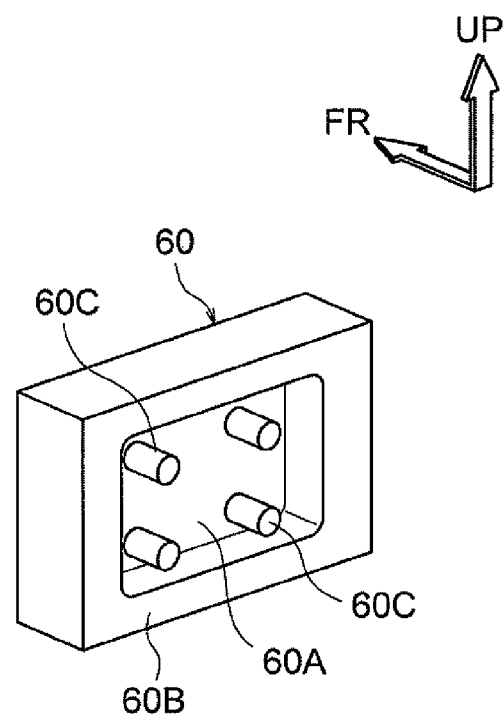
FIG. 17 is a perspective view illustrating a configuration of a dilatant pad according to the sixth exemplary embodiment of the present invention.

FIG. 16 is a vertical cross-section of a vehicle headrest device according to a sixth exemplary embodiment of the present invention. FIG. 17 is a perspective view of a dilatant pad 60 serving as a head load-bearing member according to the sixth exemplary embodiment.

The present exemplary embodiment is configured fundamentally the same as the fifth exemplary embodiment, however a dilatant pad 60 according to the present exemplary embodiment includes plural (four in this case) leg portions 60C that project out towards the rear side from a central side of the rear face of a plate shaped portion 60A. The leg portions 60C are formed in circular column shapes with rear ends (leading ends) that are in contact with the front face of a front wall section 20A of an insert 20. Urethane foam 26 is present between the rear face of the plate shaped portion 60A and the front face of the front wall section 20A at a region excluding the side wall portions 60B and the plural leg portions 60C.

In the present exemplary embodiment deformation of the central side of the plate shaped portion 60A is suppressed by the leg portions 60C. Consequently, the deformation mode of the plate shaped portion 60A can be easily set or modified by appropriately setting or modifying the number and/or shape of the leg portions 60C. Note that the above sixth exemplary embodiment is configured with the rear ends of the plural leg portions 60C in contact with the front wall section 20A of the insert 20, however the eleventh aspect of the invention is not limited thereto provided that leg portions are facing and contactable with an insert.

Seventh Exemplary Embodiment

Figure 18:
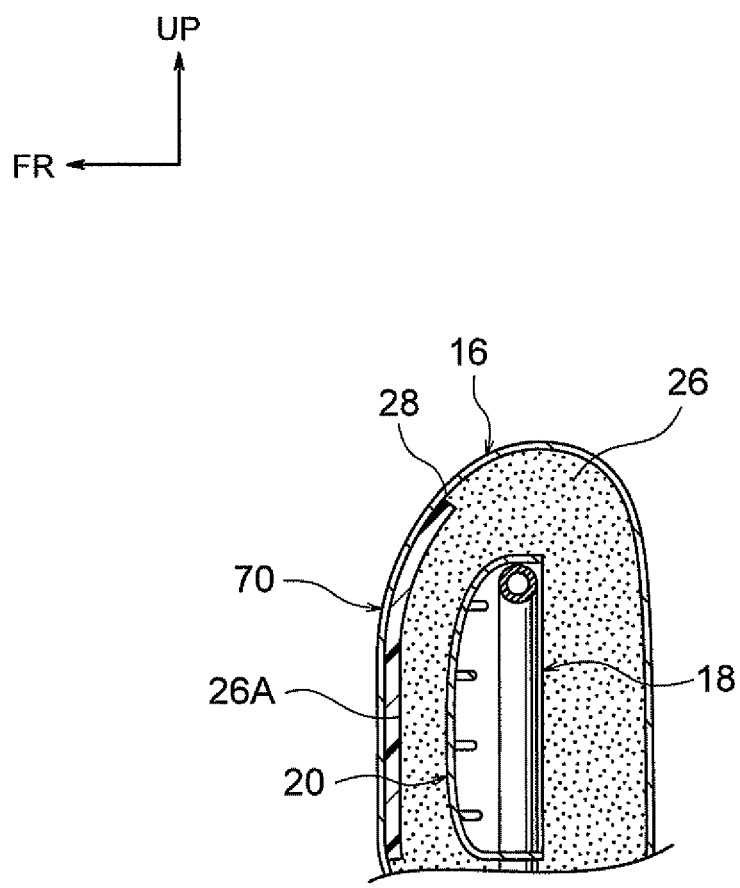
FIG. 18 is a vertical cross-section illustrating a configuration of a vehicle headrest device according to a seventh exemplary embodiment of the present invention.

FIG. 18 is a vertical cross-section illustrating a vehicle headrest device according to a seventh exemplary embodiment of the present invention. The present exemplary embodiment is configured fundamentally the same as the first exemplary embodiment. However, in the present exemplary embodiment, urethane foam 26 is disposed between an insert 20 and a headrest cover 28 at the front portion of a headrest body 16. In the present exemplary embodiment the configuration of a dilatant pad 70 serving as a head load-bearing member is different from the configuration of the dilatant pad 22 according to the first exemplary embodiment.

The dilatant pad 70 is formed from d3o™ in a thin plate shape (sheet form), and is disposed between a front face 26A of the urethane foam 26 and the headrest cover 28 with the plate face (rear face) of the dilatant pad 70 in a state of contact with the front face 26A of the urethane foam 26.

In the present exemplary embodiment, when load from the head of an occupant is imparted to the front portion of the headrest body 16, the thin plate shaped dilatant pad 70 disposed between the front face 26A of the urethane foam 26 and the headrest cover 28 hardens. Due to the plate face of the dilatant pad 70 being disposed in a state of contact with the front face of the urethane foam 26, the load imparted to the front face 26A of the urethane foam 26 through the dilatant pad 70 can be dispersed over a wide surface area of the front face 26A. The amount of deformation of the urethane foam 26 can thereby be reduced, and rearward movement of the head of the occupant that is imparting load to the urethane foam 26 through the dilatant pad 70 can be suppressed.

Note that while the above seventh exemplary embodiment is equipped with the insert 20, the exemplary embodiments are not limited thereto and the insert 20 may be omitted.

In each of the above exemplary embodiments configuration is made with the headrest body 16 connected (attached) to the top end side of the seatback 14 however the first aspect of the invention is not limited thereto and configuration may be made with the headrest body 16 integrally provided at the top end side of the seatback 14. Such cases are configured with an integrally formed headrest frame and seatback frame.

Various other modifications may be implemented in the present invention within a range not departing from the spirit of the invention. Obviously the scope of rights of the present invention is not limited by the above exemplary embodiments.

The invention claimed is:

1. A vehicle headrest device, comprising:
a headrest body provided at a top end side of a seatback in a vehicle seat, the headrest body including:
a support member that is attached to a headrest frame to form a framework, the support member having a front face that is formed in a curved plane shape, and being formed with a plurality of holes disposed in the front face of the support member; and
a head load-bearing member that is formed from a material with dilatant characteristics and is disposed at a front portion of the headrest body, the head load-bearing member having a plurality of projections that project rearwardly away from the head load-bearing member, wherein
the front face of the support member is in contact with a rear face of the head load-bearing member such that the support member supports the head load-bearing member from the rear, and
the plurality of projections of the head load-bearing member fit into the plurality of holes disposed on the front face of the support member such that the head load-bearing member is retained in a curved state along the front face of the support member.

2. The vehicle headrest device of claim 1, wherein the headrest body further comprises:
a foam body that is integrally foam molded together with the headrest frame, the support member and the head load-bearing member; and
a headrest cover covering the foam body.

3. The vehicle headrest device of claim 1, wherein:
the support member further comprises a front wall section disposed at a front side of the headrest body, the front wall section forming the front face of the support member;
the plurality of holes are formed in the front wall section; and
a plurality of ribs are integrally formed in a lattice formation and disposed in a direction of a back face of the front wall section.

4. The vehicle headrest device of claim 2, wherein:
the support member further comprises a front wall section disposed at a front side of the headrest body, the front wall section forming the front face of the support member;
the plurality of holes are formed in the front wall section; and
a plurality of ribs are integrally formed in a lattice formation and disposed in a direction of a back face of the front wall section.

* * * * *